Patented Apr. 15, 1941

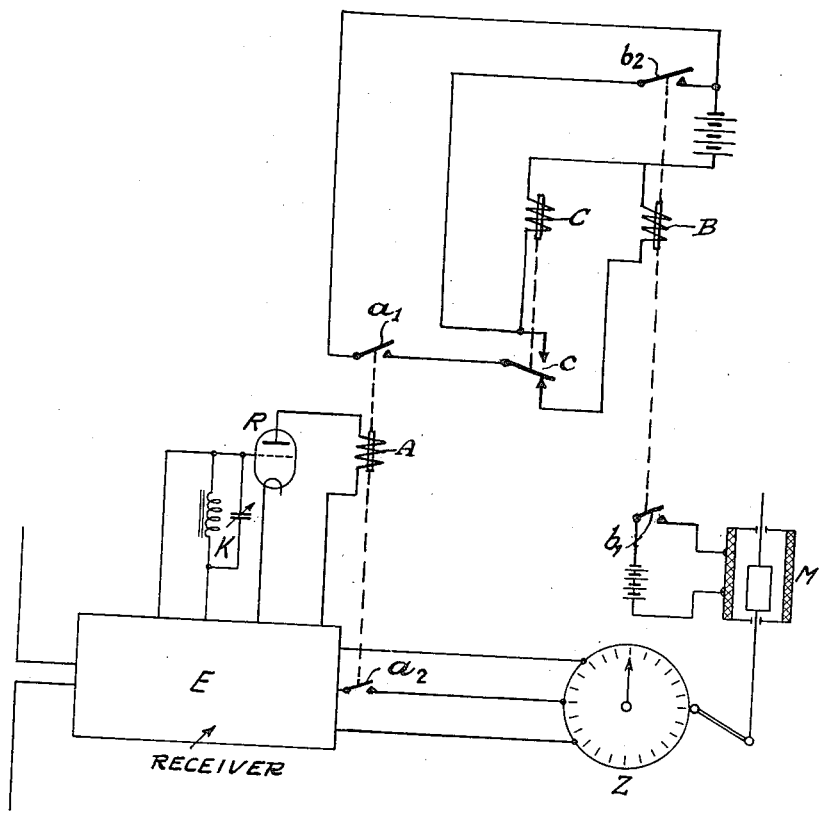

2,238,279

UNITED STATES PATENT OFFICE 2,238,279

ELECTRIC INDICATING DEVICE

Ernst Müller, Berlin, Germany, assignor to C. Lorenz Aktiengesellschaft, Berlin-Tempelhof, Germany, a company Application February 1, 1939, Serial No. 253,991
In Germany February 4, 1938

6 Claims. (Cl. 250—2)

The present invention briefly relates to electric indicating devices, and more closely to new and useful means for restoring such devices to normal position after an indicating action, specifically when employed in wireless navigation of vehicles, vessels and the like.

The invention is particularly well adapted for use in connection with "Methods of and means for determining positions by means of a rotating radio beacon," as set forth in the copending U. S. patent application Ser. No. 17,043, filed on April 18, 1935, Patent No. 2,184,843, dated December 26, 1939, according to which incoming signals of different kind, such as dots and dashes, are counted from a zero or reference position by means of a counting mechanism and are then subtracted from one another. The keying of a rotating transmitter radiating such signals of different kind is interrupted by longer silent periods or pauses which in the case of a two-beam beacon are equal to half a revolution of the transmitter, for example. Such silent periods or pauses which are introduced by rendering the transmitter inactive, either by interrupting the carrier frequency energization or by disconnecting the modulation means, are utilized in the receiving position subsequent to the counting action for determining an angular position of the counting mechanism and for restoring said mechanism to normal position so as to assure that further counting from the zero or reference position may take place when the succeeding effective keying period of the transmitter again commences. The restoration to normal of the indicating devices heretofore known was either effected manually, in response to a particular signal emitted from the transmitter, or by means of a clock-work.

It is the main object of the present invention to provide simple and reliably operating means for restoring to normal or rest position indicating devices of the above mentioned type.

This is effected according to the main feature of the invention by providing the receiver equipment with a particular relay which responds to the effectiveness of the transmitter, that is, when its carrier frequency energization or its modulating means become effective, and which in operating causes a relay system forming part of a local circuit of the receiver to restore the indicating device to normal or rest position.

According to a further feature of the invention the same relay system disconnects the counting and indicating device from the transmitter during the ineffective periods of the transmitter, that is, during the time available for ascertaining the pointer position of the indicating device, so as to prevent this device from being influenced by extraneous signals which might be picked up by the receiver.

The invention will be more fully understood from the following description, taken in conjunction with the accompanying drawing, the single figure of which shows a wiring diagram according to the invention.

In this drawing, E denotes the receiver responsive to the signal transmission from a cooperating directional transmitter, and Z is an indicating device, a counting mechanism for example, which indicates the resulting values of the received signals with respect to the position of the receiver. This device is operated in a known maner by direct or alternating curent impulses applied thereto from the output of receiver E. Such counting mechanisms are designed, for instance, as stepping mechanisms and are known in themselves. However, unless precautions are taken static or disturbing impulses may cause a false count giving an inaccurate indication. To prevent such errors a portion of the input voltage picked up by the receiver E is, after amplification, branched off therefrom and applied to a relay A, preferably through an amplifier circuit. In the embodiment shown, the relay A is inserted in the anode circuit of the thermionic amplifier tube R, although this relay may be connected in different manners without departing from the scope of the present invention. A resonance circuit K comprising an inductance and a variable capacity, for example, is preferably included in the grid circuit of the amplifier tube so that relay A can be operated only when the desired signal frequency is received, and also for the purpose of resetting the apparatus in accordance with received signals. In cases that the low frequency voltage is employed, the resonance circuit K should be tuned to the frequency of modulation impressed upon the transmitter, while in cooperation with a continuous wave transmitter this circuit should be tuned to the tone of the low frequency local oscillations generated in the receiver, so as to eliminate the possibility for extraneous voltages to affect the restoration procedure. A relay contact $a_2$ is included in the counting mechanism circuit to control the counting mechanisms operative condition. When contact $a_2$ is open counting mechanism Z cannot be influenced by signal or impulse output from receiver E. Consequently Z can only operate when signals are actually being received. The resonant filter circuit K prevents relay A from operating due to the receipt of extraneous impulses. The transmitter itself is ineffective during the silent periods which are utilized in the receiver for ascertaining the indication made by the device Z.

A short moment prior to the signal transmission the transmitter is rendered effective with the result that the relay A of the receiver responds. This relay attracts and closes its contact $a1$ which establishes an energizing circuit for the relay B from battery via contacts $a1$ and $c$ lower contact, through relay B, to battery. Relay B energized, closes at its contact $b1$ an obvious circuit from battery through the electromagnet M, the armature of which is caused to attract and to restore the indicating device Z to normal position. This arrangement may be simplified in such manner that the relay B itself forms the energizing winding of the electromagnet M.

A further relay C is provided and this relay has for its object to precautionary disconnect the relay B from the local circuit after finished restoring action. The energization of the relay B heretofore described, also moves the contact $b2$ to its front position, thus establishing an obvious circuit for the relay C, which in turn reverts its contact $c$ to its upper position of the drawing. The relay B is thereby de-energized at lower contact of $c$, but although its contact $b2$ is restored to its back position, the relay C remains energized via its contact $c$ and the contact $a1$ as clearly shown. At the end of the active transmitter period, that is, when the silent period commences, the relay A releases. Its contact $a1$ opens the circuit for relay C so that the function circuit of the relay B is again prepared at contact $c$ when the relay A again responds to the effectiveness of the transmitter and closes its contact $a1$. Moreover, the relay A is also equipped with a second contact $a2$ interposed in the circuit of the indicating device. This contact is closed during the energization of relay A, that is to say, during the effective intervals, while being open during the silent transmitter periods, i. e. when the indicating device is read off and subsequently restored to normal. Incident harmful voltages are thus unable to influence this device. When the signal transmission from the transmitter again starts, the energization of relay A causes the contact $a2$ to be closed so that the receiver and the indicating device are interconnected with one another.

The directional transmitter is rendered effective a short moment, approximately .5 second, prior to the beginning of the keying period in order to ascertain that the restoration has been completely finished when the signal radiation starts.

The characterization or distinguishing signal of the transmitter is preferably sent out during the silent periods or pauses. In order to avoid that the restoring device of the receiver might be influenced by such characterization signal or signals, the latter may preferably be modulated in the transmitter with a different modulating frequency or tone than that affecting the counting mechanism, or, when continuous waves are emitted, the frequency of said characterization signal or signals may be slightly different from the effective frequency of the transmitter so as to enable the resonance circuit K of the transmitter to reject such frequencies so as to render the relay A immune thereagainst.

Finally, the above mentioned relay system may also be employed for lighting signalling lamps, preferably for illuminating the scale and/or the pointer of the indicating device. Such lamps will suitably be lighted in the time interval during which the indication of the device is to be observed, while being extinguished during the operative periods so as to ostensively direct the operator's attention to the indicating scale during the intervals when the pointer setting is to be observed.

What is claimed is:

1. In combination with an electric indicating device and a radio receiver in cooperation with a radio transmitter operating with effective and ineffective periods, comprising an arrangement for restoring said indicating device to normal subsequent to an indication produced by signals picked up by said receiver operatively associated with said receiver, which arrangement comprises a first relay connected to said receiver and operable in response to effective periods of said transmitter, a local circuit containing further relays means operative in response to the energization of said first relay for completing a circuit to operate said further relays, and means responsive to operation of said further relays restoring said indicating device to normal position.

2. In combination with an electric indicating device and a radio receiver as defined in claim 1, further comprising means responsive to energization of said first relay for operatively disconnecting said receiver from said indicating device.

3. In combination with an electric indicating device and a radio receiver in cooperation with a radio transmitter operating with effective and ineffective periods, comprising an arrangement operatively associated with said receiver for restoring said indicating device to normal subsequent to an indication produced by signals picked up by said receiver, said arrangement comprising a separate amplifying tube having a cathode, a grid and an anode, a resonance circuit connected to said grid, means in said receiver for branching off a portion of the received voltages and applying said portion to said resonance circuit, a first relay connected to the anode circuit of said tube and operable in response to signals received during the effective periods of said transmitter, a local circuit including a second and a third relay and means operated in response to the energization of said first relay for energizing said second and third relay to restore said indicating device to normal.

4. In combination with an electric indicating device and a radio receiver as defined in claim 3, further comprising an electromagnet operated in response to said second relay serving to restore the said indicating device to normal position in response to the operation of said second relay.

5. In combination with an electric indicating device and a radio receiver as defined in claim 3, further comprising means whereby the winding of the said second relay acts as an electromagnet for restoring said indicating device to normal position.

6. In combination with an electric indicating device and a radio receiver as defined in claim 3, further comprising an electro-magnet controlled by said second relay for restoring said indicating device to normal and means including a third relay for releasing said electro-magnet subsequently to a finished restoration action.

ERNST MÜLLER.